United States Patent
Campo et al.

(10) Patent No.: US 7,335,304 B2
(45) Date of Patent: Feb. 26, 2008

(54) METHOD FOR REDUCING SLUDGE OF A BIOLOGICAL OZONE TREATMENT SYSTEM

(75) Inventors: Philippe Campo, Montigny le Bretonneux (FR); Jérôme Cluzeau, Versailles (FR); Christian Jalbert, Saint Jean d'Aigues (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/530,850

(22) PCT Filed: Oct. 2, 2003

(86) PCT No.: PCT/FR03/50075

§ 371 (c)(1),
(2), (4) Date: Jan. 3, 2006

(87) PCT Pub. No.: WO2004/033371

PCT Pub. Date: Apr. 22, 2004

(65) Prior Publication Data

US 2006/0086661 A1    Apr. 27, 2006

(30) Foreign Application Priority Data

Oct. 10, 2002   (FR) .................. 02 12593

(51) Int. Cl.
*C02F 3/00*   (2006.01)

(52) U.S. Cl. ................. 210/620; 210/760; 210/220

(58) Field of Classification Search ........... 210/620, 210/760, 220
See application file for complete search history.

(56) References Cited

U.S. PATENT DOCUMENTS

| 5,411,633 A | * | 5/1995 | Phillips et al. ........... 162/52 |
| 5,573,670 A | | 11/1996 | Nagasaki et al. |
| 6,270,061 B1 | | 8/2001 | Bouquet et al. |

FOREIGN PATENT DOCUMENTS

| DE | 199 20 269 | 3/2001 |
| EP | 0 995 485 | 4/2000 |
| FR | 2 668 765 | 5/1992 |
| WO | WO 01 21535 | 3/2001 |

OTHER PUBLICATIONS

International Search Report for PCT/FR03/50075, Jun. 2004.
Patent Abstracts of Japan, vol. 018, No. 262, May 19, 1994, & JP 06 039390, Feb. 15, 1994.
Patent Abstracts of Japan, vol. 017, No. 393, Jun. 10, 1993, & JP 05 023688, Feb. 2, 1993.

* cited by examiner

*Primary Examiner*—Chester T. Barry
(74) *Attorney, Agent, or Firm*—Christopher J. Cronin

(57) ABSTRACT

Methods for treating aqueous effluent, which include reducing sludge formation during the biological treatment of an aqueous effluent. The sludge formation is reduced by injecting an ozone containing gas into an aeration tank which contains the effluent. The affluent is in contact with microorganisms in the tank at least once during the method. The ozone containing gas contains at least 2.5 mg of ozone per liter of the gas.

8 Claims, No Drawings

METHOD FOR REDUCING SLUDGE OF A BIOLOGICAL OZONE TREATMENT SYSTEM

BACKGROUND

Aerobic biological treatments of effluents generally consist in contacting these effluents with a biomass (microorganisms), which degrades the pollution present in the effluents by converting the organic molecules to inorganic molecules; this step is commonly called the aeration of the biological tanks. The application of such treatments causes a progressive increase in the quantity of biomass and creates a need to dispose of the excess biomass commonly called "excess sludge". Various solutions have been proposed for dealing with the steadily growing quantity of this excess biological sludge and for its disposal.

A first family of methods consists in withdrawing this excess sludge after the biological treatment and either finding a suitable outlet for it or treating it in a specific degradation step. It can thus be used as a fertilizer in agriculture (spreading). However, compliance with environmental standards and the potential presence of micropollutants or heavy metals in the sludge have led to a reduction of this use. Another solution is to withdraw this sludge and incinerate it; this demands transporting it to an incinerator, incurring a cost. Moreover, difficulties in installing new incinerators are hindering the development of this solution. Another solution is to carry out wet oxidation of the excess sludge: this makes the sludge inorganic.

A second family of methods consists in reducing the production of sludge during the biological treatment. These solutions consist in using means serving to reduce sludge production during the biological process of removing pollution from water. These solutions consist in carrying out a partial lysis of the sludge, that is the destruction of part of the microorganisms making up the sludge by making them partially soluble. The products of this lysis, which contain at least partially soluble organic compounds, can then be sent to the head end of the effluent treatment to undergo biological treatment, during which the microorganisms will treat the lysis products. A first known lysis technique consists in applying mechanical action to the sludge from the biological treatment tank which bursts a portion of the cells of the microorganisms making up the excess sludge. This may involve mechanical grinding, compression/expansion, sonochemistry, etc. This technique is generally simple to apply but presents the drawback of only slightly reducing the production of excess sludge. Moreover, the energy cost is high. A second lysis technique is basic or acid attack using chemical agents possibly combined with a rise in temperature, but this technique demands readjustment of the pH of the solution obtained before its reinjection into the aeration tank. The drawback of this solution is that it increases the salinity of the hydrolyzed sludge, which can cause malfunctions in the biological treatment step. A third lysis technique is based on the action of oxidizing agents such as ozone, air, hydrogen peroxide and pressurized oxygen. The drawback of air, hydrogen peroxide and oxygen is that they are not efficient enough alone: they must be combined with heating and/or a catalyst, thereby also increasing the cost of these techniques. As to ozone, its use requires the installation of a particular device. In fact, in its use for reducing the volume of excess sludge, ozone injection is dissociated from the aeration step of the aeration tanks. The ozone-containing gas is injected into a reactor separate from the aeration tanks. This is a drawback, because the installation is costly and its application on existing units is complicated.

Document U.S. Pat. No. 5,573,670 mentions the possibility of injecting an ozone-containing gas with a very low ozone concentration (0.01 to 0.16% by weight of $O_3$ with respect to $O_2$) into an aeration tank of a biological treatment unit for aqueous effluents, for the sole purpose of preventing the formation of filamentous bacteria and of significantly reducing the Total Organic Carbon (TOC). No influence of this direct injection of low ozone gas on the proportion of excess sludge has been demonstrated.

SUMMARY

It is an object of the present invention to propose a novel use of ozone for reducing the excess sludge conventionally produced during the biological treatment of waste water, not presenting the difficulties of application described above.

For this purpose, the invention relates to a method for reducing the sludge formed during the biological treatment of an aqueous effluent, said treatment comprising at least one step during which the effluent is contacted with microorganisms in an aeration tank, in which method an ozone-containing gas comprising at least 2.5 mg of ozone per liter of gas is injected into the aeration tank by means of an apparatus producing an emulsion of ozone-containing gas in the effluent. The invention relates to any type of effluent treatment method in which the effluent is subjected to a biological treatment step. During this biological treatment step, the effluent is contacted with microorganisms (biomass) and a biological sludge is generated. This sludge generally comprises living and dead microorganisms, cell fragments, absorbates and organic colloids, organic corpuscles and/or inorganic particles.

According to the invention, an ozone-containing gas is injected into the aeration tank in order to obtain an aeration of the tank and a lysis of the microorganisms present in the biological sludge, and thereby to reduce the formation of excess sludge. According to the invention, ozone-containing gas means a gas comprising at least ozone and oxygen. A first essential feature of the invention is that the ozone-containing gas is injected directly into the aeration tank. A second essential feature concerns the composition of the ozone-containing gas, which must comprise at least 2.5 mg of ozone per liter of gas. Preferably, this ozone-containing gas contains no more than 300 mg of ozone per liter of gas.

DESCRIPTION OF PREFERRED EMBODIMENTS

According to the invention, the ozone-containing gas is injected directly into the aeration tank by means of an apparatus producing an emulsion of ozone-containing gas in the effluent. Advantageously, the apparatuses known for having a high oxygen transfer rate in aqueous effluents are used. In fact, the use of these apparatuses generally makes it possible to transfer nearly all the ozone to the effluent and thereby to incur no environmental risk of ozone release into the atmosphere. This derives from the fact that the solubility of ozone in water is approximately ten times higher than that of oxygen, and its reactivity in the effluent is very rapid (during the tests, no residual ozone was detected in the mixture of effluent and biological sludge leaving the aeration tank).

According to a first embodiment, the means for transferring the ozone-containing gas to the effluent can consist of a venturi supplied by a pump and comprising a means for injecting gas into the throat of the venturi. The pump is suitable for circulating the effluent from the aeration tank in the venturi and the gas injection means injects the ozone-containing gas into the effluent stream created by the venturi and the pump. This produces an ozone-containing gas/liquid effluent emulsion that is diffused in the aeration tank. This diffusion can be improved by means of nozzles and ejectors placed after the venturi in the effluent flow direction. This type of apparatus is marketed by Air Liquide under the reference Ventoxal®.

According to a second embodiment, the means for transferring the ozone-containing gas to the effluent can consist of a turbine and a means for injecting gas into the turbine. According to a preferred variant, this device consists of a self-suction turbine and a propeller, said self-suction turbine and said propeller being mounted on the same hollow drive shaft, and said hollow shaft supplying ozone-containing gas to the turbine. More precisely, this type of device comprises a driving device placed above the liquid to be stirred and provided with a shaft equipped at its bottom end with at least one mobile axial flow element immersed in the liquid. The shaft also carries the self-suction turbine immersed in the liquid, which can also be driven by the shaft. The shaft is coaxially enveloped by a cylinder connected at its upper end in a sealed manner to the driving device, and of which the bottom end emerges into the turbine. The upper end of the cylinder is drilled with an injection opening for the ozone-containing gas in an annular space bounded by the shaft and the cylinder. During the operation of this device, the liquid is mixed by the turbine. By rotating, the turbine sucks the ozone-containing gas through the annular space of the shaft and diffuses it into the liquid at the level of the turbine. The gas/liquid dispersion thereby created is diffused very widely in the aeration tank by means of the turbine and the propeller generally placed under said turbine. This injection means is described in application EP-A1-0 995 485. This type of apparatus is marketed by Air Liquide under the reference Turboxal®.

For these two embodiments, the means for transferring the ozone-containing gas to the effluent have the advantage of presenting very good transfer efficiencies and an effect of partial destructuring of the biological flocs (disintegration of the flocs, indeed destruction of the cell walls of the microorganisms). This floc destructuring effect increases the effectiveness of the ozone for reducing the biomass.

The ozone-containing gas can be derived directly from an ozone generator or another step of the effluent treatment method, which also uses an ozone-containing gas. Thus, the ozone-containing gas can be the residual ozone-containing gas from a gas vent (recycling).

Due to the very rapid decomposition of ozone in aqueous effluents and its high solubility in these effluents, the transfer of the ozone to these effluents is close to 100% and the formation of ozone on the surface of the aeration tanks is avoided. The method according to the invention presents the advantage of combining, in a single step: the at least partial aeration of the biological tank by means of the oxygen in the ozone-containing gas, and the reduction of the sludge by means of the large quantity of ozone in the ozone-containing gas.

EXAMPLE

Oxygenation for Aeration and Ozonization for Reducing the Simultaneous Sludge Production of a Biological Tank A tank 9 m in depth and 6000 $m^3$ in volume is aerated using two Ventoxal® apparatuses. Each Ventoxal® apparatus injects 53 $Nm^3/h$ of oxygen corresponding to the hourly aeration requirement. The production of excess biological sludge extracted daily and serving to keep the sludge concentration constant in the aerated tank is 460 kg/day.

On a parallel and identical treatment system, the oxygen from one of the two Ventoxal® apparatuses is doped with 17 mg/l of ozone. Daily sludge production drops to 320 kg/day, a 30% reduction. An improvement in the sludge index is also observed, as well as easier dehydration of the remaining excess sludge.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for reducing sludge formation during the biological treatment of an aqueous effluent, said method comprising reducing the amount of sludge formed during the biological treatment of an aqueous effluent by injecting an ozone containing gas into an aeration tank which contains said effluent, wherein:
   a) during at least one portion of said method, said effluent is in contact with microorganisms;
   b) said ozone containing gas comprises at least about 2.5 mg of ozone per liter of said gas injected into said tank;
   c) said gas is injected into said tank by an apparatus; and
   d) said apparatus produces an emulsion of ozone containing gas in said effluent.

2. The method of claim 1, wherein said ozone containing gas comprises less than about 300 mg of ozone per liter of said gas.

3. The method of claim 1, wherein said apparatus comprises:
   a) a venturi supplied by a pump; and
   b) an injection means for injecting said gas into the throat of said venturi.

4. The method of claim 2, wherein said apparatus comprises:
   a) a venturi supplied by a pump; and
   b) an injection means for injecting said gas into the throat of said venturi.

5. The method of claim 1, wherein said apparatus comprises:
   a) a turbine; and
   b) an injection means for injecting said gas into said turbine.

6. The method of claim 2, wherein said apparatus comprises:
   a) a turbine; and
   b) an injection means for injecting said gas into said turbine.

7. The method of claim 5, wherein:
   a) said apparatus further comprises:
      1) a self-suction turbine; and
      2) a propeller;
   b) said self-suction turbine and said propeller are mounted on a hollow shaft; and
   c) said hollow shaft supplies said gas to said turbine.

8. The method of claim 6, wherein:
   a) said apparatus further comprises:
      1) a self-suction turbine; and
      2) a propeller;
   b) said self-suction turbine and said propeller are mounted on a hollow shaft; and
   c) said hollow shaft supplies said gas to said turbine.

* * * * *